Patented Apr. 15, 1930

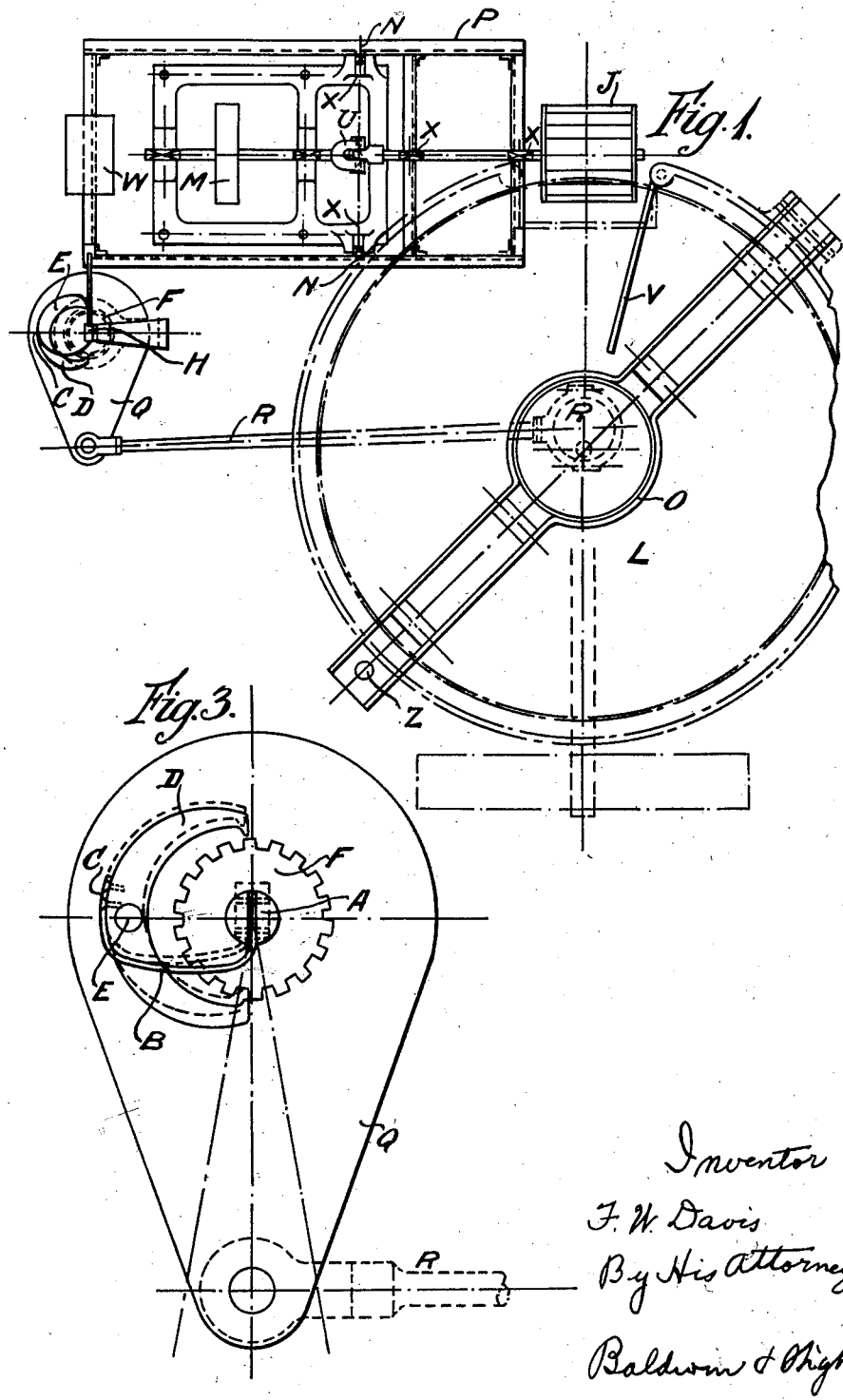

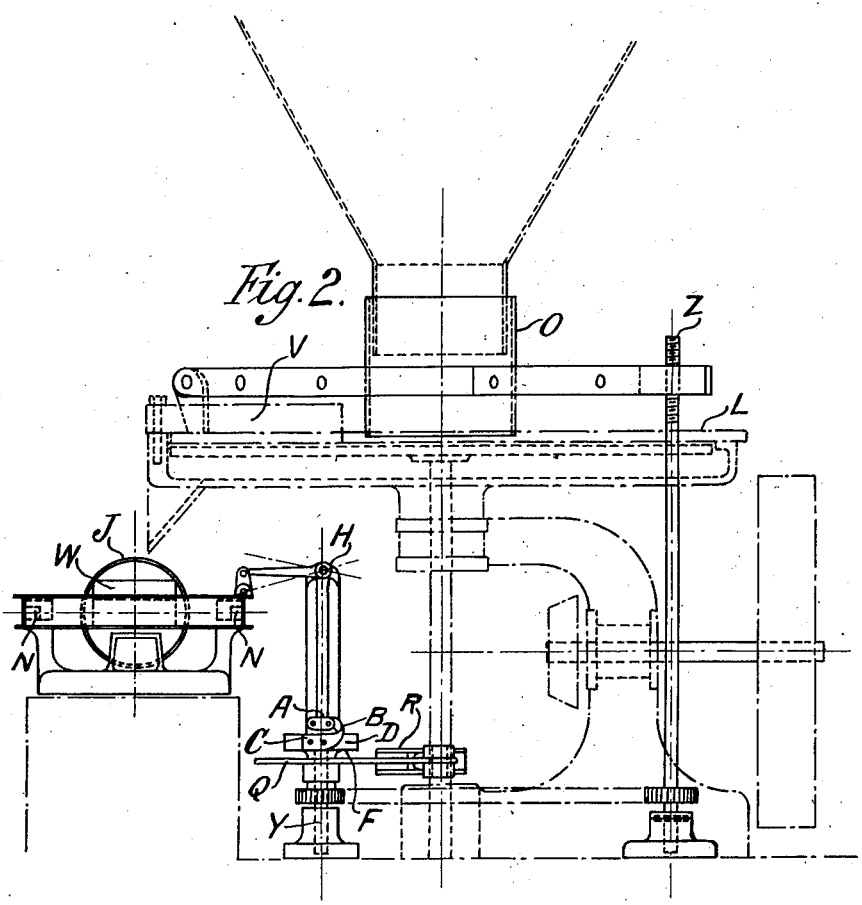

1,755,103

UNITED STATES PATENT OFFICE

FREDERICK WILLIAM DAVIS, OF KINGSTON-UPON-HULL, ENGLAND, ASSIGNOR TO F. L. SMIDTH AND COMPANY, LIMITED, OF LONDON, ENGLAND

APPARATUS FOR DELIVERING REGULAR QUANTITIES OF GRANULAR OR PULVERIZED MATERIAL

Application filed July 31, 1928, Serial No. 296,618, and in Great Britain August 5, 1927.

This invention relates to apparatus for delivering granular or pulverized materials of the type in which the material is supplied to a rotating table near its centre and is removed from the table by a scraper, knife or other known means of removal and also relates particularly to improvements in the apparatus described in the British patent specification No. 182,046 for automatically regulating and controlling the flow of such material from the rotating table.

In the above cited specification, the position of the weighing scale, which weighs the material as it passes along a belt conveyor from a rotating table, is made to determine whether a controlling shaft shall rotate in a clockwise or anti-clockwise direction, or remain still.

According to my invention, which is the subject of this specification, the belt conveyor is not required and the weighing scale comprises a rotating drum which acts as a scale pan, fitted with pockets and placed in such position relative to the rotating table, that the material falling from the table enters the pockets as they ascend, and leaves them by gravity on the descending side of the drum, being thus deposited into a suitable receiving hopper. One advantage of this arrangement is that the scale is enabled to utilize the inertia of the material falling from the feed table into the drum, thus increasing the sensitiveness.

Power to rotate this drum is transmitted from an outside source, preferably in fixed gear from the rotating table and is communicated to the drum, or pan, through a flexible, or universal coupling, horizontally in line with the fulcrum of the scale. The movements of the scale control the supply of material.

Other features of the invention will be evident from the following description.

My invention is illustrated in the accompanying drawings in which Figures 1 and 2 are respectively a plan and elevation of the machine, and Figure 3 is a view of a detail.

Referring to Figure 1, a rotary motion is communicated from an outside source to the pulley M and universal joint U, which is in line with the fulcrum N, N of the scale. This portion of the apparatus, with its two bearings X, X is permanently fixed and does not oscillate with the scale. The oscillating half of the universal joint communicates a rotating movement to the drum or pan J which is fitted with pockets designed to hold the material to be weighed. This half of the coupling with its shaft and bearings X, X together with the frame of the scale P and the counterweight W oscillates about the fulcrum N under the influence of the weight of the material in the drum J from time to time.

The relative position of the scale, and the rotating table are shown in elevation in Figure 2 where L is the rotating table of the usual pattern.

The scraper V causes the material to fall into the pockets of the rotating drum J as the table rotates, and the amount of such material raises, or lowers, the position of this drum by reason of its weight and inertia.

This upward and downward motion of the drum is communicated to a bell crank lever A pivoted at H, the perpendicular arm of which oscillates in pendulum fashion under the influence of the scale. The operation is further illustrated in Figure 3.

The end of the bell crank lever A is embraced, or connected, to the flat spring at B whose other end is fixed rigidly at C to the pawl D. This pawl moves on its pivot E under the influence of the bell crank lever A and the spring B and accordingly engages in the teeth of the double ratchet wheel F on one side, or the other as may be determined by the movement of the bell crank lever A.

A rocking motion from an independent connecting rod R shown in Figure 3 is imparted to the pawl plate Q and the pivot E which rock to and fro about the centre A', carrying the pawls D with them. The pawls, therefore (as shown by the dotted lines in Figure 3) engage in the teeth of the ratchet wheel F on one side or other as may be determined by the position of the bell crank lever A and its spring B and impart a clockwise or anti-clockwise motion to the ratchet wheel F, or when in neutral position leave it unaffected, as shown by full lines in Figure 3.

The position of the controlling bell crank lever A being at or near the centre of the rocking motion imparted to the pawls, leaves it practically unaffected by such rocking motion.

Returning to Figure 2, it will be seen that the rocking motion is communicated to the pawls by an eccentric bearing, or crank shaft R and plate Q which is mounted on shaft Y and to the latter the ratchet wheel F is fixed.

The clockwise or anti-clockwise motion, which is transmitted to the ratchet wheel F is communicated to the upright shaft Z by gearing, chain, or any known transmission means T.

This shaft Z by means of a screw thread at its upper end raises and lowers the telescoping tube O which, by reason of its varying distance above the rotating table, admits, more or less, of the granular material to the feed table and thence to the rotating drum J.

The action of the scale may be briefly described as follows:—

When the quantity of material at any moment in the rotating drum J is too great, its weight causes the descent of the scale and, through the bell crank lever and pawls, the vertical shaft Z is rotated in such direction that the telescoping collar above the rotating table is lowered and the quantity of material delivered to the scale is reduced.

Conversely, when the weight of material at a given moment in the drum J is too light, the drum with its bell crank lever attachment, will be operated in the opposite direction, and the rotation of the shaft Z will be reversed and the telescoping collar will be raised, thus admitting more material on to the rotating table.

What I claim is:—

1. Means for delivering material comprising a rotating table adapted to receive the material, means for regulating the supply, a rotating drum adapted to receive the said material and pivotally mounted so as to act as a scale pan and means whereby the pivotal movements of the said drum control the supply of the said material.

2. Means for delivering material comprising a rotating table, a scraper for regulating the supply of the said material, a rotating drum adapted to receive the said material and pivotally mounted so as to act as a scale pan and means whereby the pivotal movements of the said drum control the supply of the said material.

3. Means for delivering material comprising a rotating table, a telescoping collar for regulating the supply of the said material, a rotating drum adapted to receive the said material and pivotally mounted so as to act as a scale pan and means whereby the pivotal movements of the said drum control the supply of the said material.

4. Means for delivering material comprising a rotating table adapted to receive the material, means for regulating the supply of material, a rotating drum adapted to receive the said material and pivotally mounted so as to act as a scale pan, and pawl mechanism whereby the pivotal movements of the said drum control the supply of the said material.

5. Means for delivering material comprising a rotating table, a scraper for regulating the supply of the said material, a rotating drum adapted to receive the said material and pivotally mounted so as to act as a scale pan, and pawl mechanism whereby the pivotal movements of the said drum control the supply of the said material.

6. Means for delivering material comprising a rotating table, a telescoping collar for regulating the supply of the said material, a rotating drum adapted to receive the said material and pivotally mounted so as to act as a scale pan, and pawl mechanism whereby the pivotal movements of the said drum control the supply of the said material.

7. Means for delivering material comprising a rotating table adapted to receive the material, means for regulating the supply of material, a rotating drum adapted to receive the said material and pivotally mounted so as to act as a scale pan, driven mechanism including a flexible coupling adapted to actuate the said drum, and means whereby the pivotal movements of the said drum control the supply of the said material.

8. Means for delivering material comprising a rotating table, a scraper for regulating the supply of the said material, a rotating drum adapted to receive the said material and pivotally mounted so as to act as a scale pan, driven mechanism including a flexible coupling adapted to actuate the said drum, and means whereby the pivotal movements of the said drum control the supply of the said material.

9. Means for delivering material comprising a rotating table, a telescoping collar for regulating the supply of the said material, a rotating drum adapted to receive the said material and pivotally mounted so as to act as a scale pan, driven mechanism including a flexible coupling adapted to actuate the said drum, and means whereby the pivotal movements of the said drum control the supply of the said material.

10. Means for delivering material comprising a rotating table adapted to receive the material, means for regulating the supply of material, a rotating drum adapted to receive the said material and pivotally mounted so as to act as a scale pan, driven mechanism including a flexible coupling adapted to actuate the said drum, and pawl mechanism whereby the pivotal movements of the said drum control the supply of the said material.

11. Means for delivering material comprising a rotating table, a scraper for regulating the supply of the said material, a rotating drum adapted to receive the said material and pivotally mounted so as to act as a scale pan, driven mechanism including a flexible coupling adapted to actuate the said drum, and pawl mechanism whereby the pivotal movements of the said drum control the supply of the said material.

12. Means for delivering material comprising a rotating table, a telescoping collar for regulating the supply of the said material, a rotating drum adapted to receive the said material and pivotally mounted so as to act as a scale pan, driven mechanism including a flexible coupling adapted to actuate the said drum, and pawl mechanism whereby the pivotal movements of the said drum control the supply of the said material.

In testimony that I claim the foregoing as my invention I have signed my name this 16th day of July, 1928.

FREDERICK WILLIAM DAVIS.